No. 778,853. PATENTED JAN. 3, 1905.
J. C. GARY.
NUT LOCK.
APPLICATION FILED MAR. 2, 1904.

Witnesses

Inventor
J. C. Gary.
By R. S. & A. B. Lacey, Attorneys

No. 778,853.

Patented January 3, 1905.

UNITED STATES PATENT OFFICE.

JOHN C. GARY, OF WINFIELD, WEST VIRGINIA.

NUT-LOCK.

SPECIFICATION forming part of Letters Patent No. 778,853, dated January 3, 1905.

Application filed March 2, 1904. Serial No. 196,183.

*To all whom it may concern:*

Be it known that I, JOHN C. GARY, a citizen of the United States, residing at Winfield, in the county of Putnam and State of West Virginia, have invented certain new and useful Improvements in Nut-Locks, of which the following is a specification.

This invention relates to novel improvements in nut-locks, and is adapted particularly for application in securing nuts to bolts utilized for attaching parts subjected to much vibration or jar.

The invention involves a peculiar disposal of complemental nuts and special interlocking means between the said nuts, whereby same are prevented from unscrewing accidentally from the bolt with which they coöperate.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a sectional view through a bolt, showing the application of the invention. Fig. 2 is a horizontal sectional view. Fig. 3 is a detail view of the inner nut provided with the notches. Fig. 4 is a detail view of the outer nut carrying the lock-dog.

Corresponding and like parts are referred to in the following description and indicated in all the views of the drawings by the same reference characters.

The special form of bolt 1, to which the invention is applied, is of the reversely-threaded type, said bolt being provided with a reduced end portion 2. Reverse threads 3 and 4 are formed upon the reduced portion 2 of the bolt 1 and the adjacent portion of the shank. Complemental nuts 5 and 6 are adapted to be secured upon the reversed threaded portions 3 and 4 of the bolt and are of course provided with corresponding threads for this purpose.

The nut 5, which is adapted to screw upon the threaded portion 4, and which is the inner nut, is provided upon its outer face with a plurality of notches 7, arranged adjacent the opening therein. The notches 7 of the nut 5 are adapted to be engaged by an element carried by the nut 6, so as to firmly establish an interlocking connection between these nuts to thereby prevent their accidental displacement. The lock element before mentioned, and which is carried by the nut 6, comprises a dog 8, which is loosely mounted in a recess 9, formed upon the under side of the nut 6. The dog 8 is provided at one end with an enlarged portion 10, which is seated within the recess 9 at one end of said recess. The end of the recess 9 receives the enlarged pivotal end of the dog 8, and the latter is preferably undercut, as shown at 11, to form a cam portion. The dog 8 is adapted to engage the notches or depressions 7 of the nut 5 as the nut 6 is screwed upon the reduced portion 3 of the bolt, and when engaged with the depressions this dog of course prevents any unscrewing movement of the nut 6, and this nut 6 when screwed hard against the nut 5 will thus lock the nut 5 from unscrewing, each of the nuts mutually coöperating to prevent displacement of the other.

In order that the nuts 5 and 6 may be removed, the nut 6 is provided with an opening 12, leading from its outer side to a point adjacent the recess 9. From the opening 12 extends a transverse or lateral opening 13, which intersects the recess 9. The key 14 is adapted to be introduced into the opening 12 of the nut 6, and this key is provided with a nib 15, adapted to extend into the lateral or transverse opening 13, so as to engage the dog 8 on turning the key. The nib 15 of the key engages the dog beneath the same and by a cam connection raises the dog out of engagement with the nut 5. The above having been accomplished it will be noted that the nut 6 may be readily unscrewed, after which the nut 5 may be removed also. The opening 12, which extends from the outer side of the nut 6, terminates within the body of the nut, the opening 13 extending laterally from the inner end of the opening 12, aforesaid. The arrangement of the openings 12 and 13 is advantageous in that when the key is introduced into the opening 12 the same cannot come into contact with the depressions of the inner nut 5, and thus there is no liability of same engaging such depressions so as to interfere with the unscrewing of the outer nut.

In assembling the parts to lock the nut 5 from displacement the dog 8 is placed within the recess 9 and held in such position by any suitable means convenient. After the nut 6 has been screwed upon the reduced portion 3 until it is adjacent the nut 5 the dog 8 may be released and will then engage the nut 5.

The lock means hereinbefore described is comparatively simple in structure, and the nuts may be quickly secured in position and readily removed. The operator who removes the nuts may be provided with a single key by which the locking-dog 8 may be disengaged.

A spring 16 is disposed between the rear wall of the recess 9 and the rear side of the dog 8, and this spring normally holds the dog in engagement with the inner nut 5.

Having thus described the invention, what is claimed as new is—

In combination with a bolt provided with reversely-threaded portions, complemental nuts screwed upon the reversely-threaded portions of the bolt, the inner nut being provided upon its outer face with a plurality of notches or depressions, the outer nut being provided upon its inner face with an elongated recess forming a seat, a lock-dog disposed within the recess of the outer nut and having an enlarged pivot end received by said recess, said lock-dog being provided with a cam-engaging surface upon its under side and adapted to engage the notches of the inner nut, the outer nut being provided with an opening leading from its outer side to a point adjacent the recess upon the under side thereof and terminating in the body of the nut, said outer nut being also provided with a second transverse opening leading from the innermost end of the opening above mentioned and intersecting the recess, said openings of the outer nut being adapted to receive a key insertible therein to engage the lock-dog.

In testimony whereof I affix my signature in presence of two witnesses.

JOHN C. GARY. [L. S.]

Witnesses:
   B. F. MORRIS,
   F. B. SALMONS.